United States Patent Office 2,766,799
Patented Oct. 16, 1956

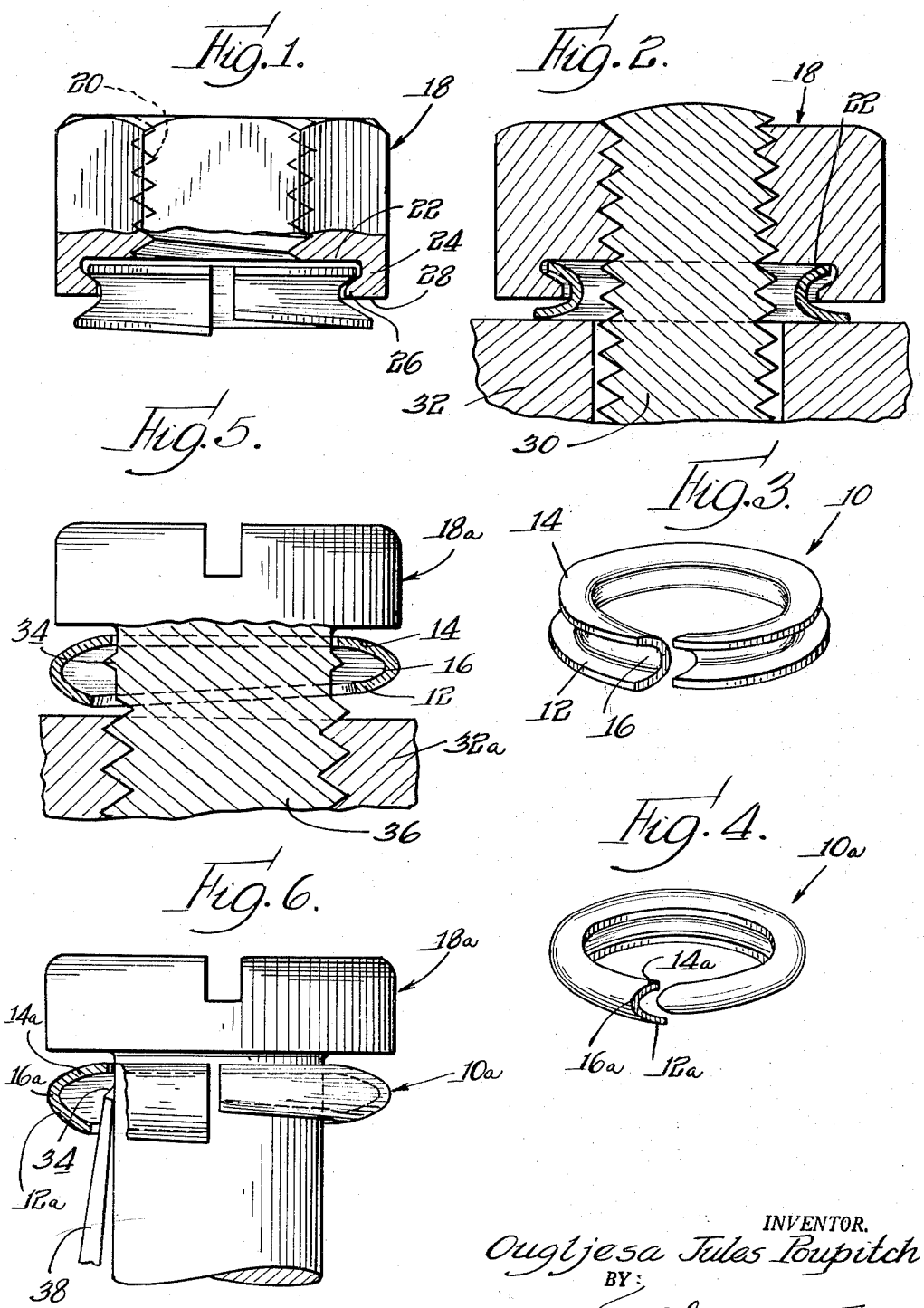

2,766,799

RESILIENT SPLIT RING LOCK WASHER HAVING SUBSTANTIALLY U-SHAPED CROSS SECTION

Ougljesa Jules Poupitch, Itasca, Ill., assignor to Illinois Tool Works, Chicago, Ill., a corporation of Illinois Application May 4, 1955, Serial No. 505,955

5 Claims. (Cl. 151—37)

The present invention relates to a novel lock washer, and more particularly, to a novel split-ring type lock washer.

An object of the present invention is to provide a novel sheet material split-ring type lock washer of U-shaped cross section which may be used in a conventional manner adjacent the clamping surface of a screw or nut and which may be readily interconnected in pre-assembled relationship with a threaded rotary fastener member such as a nut or a screw.

A further object of the present invention is to provide a novel split-ring lock washer of the above described type which is formed so as to facilitate relative rotation with respect to a threaded rotary fastener member during initial application to a workpiece and also for engaging the workpiece with progressively increased locking force as the fastener member is tightened.

Still another important object of the present invention is to provide a novel sheet material split-ring lock washer of the above described type having a plurality of axially spaced collapsible portions for providing the washer with improved locking characteristics.

Other objects and advantages of the present invention will become apparent from the following description and the accompanying drawings wherein:

Fig. 1 is an elevational view partially broken away showing a lock washer embodying one form of the present invention in assembled relationship with a nut member;

Fig. 2 is a sectional view showing the assembly of Fig. 1 applied to a workpiece;

Fig. 3 is a perspective view showing a novel lock washer of this invention;

Fig. 4 is a perspective view showing a lock washer embodying a modified form of the present invention;

Fig. 5 is a partial sectional view showing the lock washer of Fig. 4 assembled with a screw member, and in position to be tightened against a workpiece; and Fig. 6 is an elevational view partially broken away showing the manner in which the lock washer of Fig. 4 may be applied to a screw member blank.

Referring now more specifically to the drawings wherein like parts are designated by the same numerals throughout the various figures, a sheet material split-ring washer 10 embodying the principles of the present invention is shown in Figs. 1 through 3. The washer 10 is preferably constructed from spring metal. The washer 10 includes a first generally radially extending and axially flared flange 12, a second generally radially extending and axially flared flange 14 and a bight portion 16 integrally connecting the flanges. As shown best in Figs. 1 and 2 the flanges are axially spaced from each other and are flared away from each other. It should be noted that the flange 14 has a free peripheral edge which is disposed substantially in a single plane for the purpose set forth below. However, the junction between the bight portion 16 and the flange 12 is helically disposed and the free peripheral edge of the flange 12 is, in turn, helically disposed as shown in the drawings so that it is adapted to be progressively forced into engagement with a workpiece when the washer is clamped against a workpiece by a nut member 18.

The washer 10 may be easily interconnected in preassembled relationship with a nut member such as the nut member 18 which has a threaded bore 20, a radially extending clamping face portion 22, an axially extending flange 24 projecting from the periphery of the clamping face 22, an annular shoulder 26 projecting generally radially inwardly from the flange 24 and underlying the clamping surface 22, and a second clamping surface portion 28 at the end of the flange 24. The washer 10 may be assembled with the nut member by collapsing the washer radially and snapping the flange 14 over the shoulder 26. The shoulder 26 is spaced axially from the clamping surface 22 sufficiently to permit axial collapsing of the flange 14 when the washer is clamped against a workpiece and also to permit relative rotation between the washer and the nut member. It should be noted that since the peripheral edge of the flange 14 is disposed substantially in a single plane, the shoulder 26 may be formed uniformly about its circumference and may be spaced from the clamping surface 22 the minimum distance which permits axial collapsing of the flange 14 and relative rotation between the washer and the nut member.

When the washer and nut member assembly is applied to a screw 30 and clamped against a workpiece 32 as shown in Fig. 2, the helically disposed peripheral portion of the flange 12 is gradually axially compressed so that the edge progressively engages the workpiece whereby the locking effectiveness of the washer increases as it is tightened against the workpiece. Further tightening of the nut member causes axial collapsing of the flange 14 as well as further axial collapsing of the flange 12, and these two resilient portions of the washer combine to provide the washer with substantially improved locking characteristics. It should also be noted that the flange 12 projects radially outwardly of the flange 14, or in other words, has an outer diameter greater than the outer diameter of the flange 14 so that it will underlie a substantial portion of the clamping face portion 28 and cooperate therewith further to increase the holding power of the washer.

In Figs. 4, 5 and 6 there is shown a modified form of the present invention which is similar to the above described structure as indicated by the application of identical reference numerals with the suffix $a$ added to corresponding elements. In this embodiment the oppositely flaring washer flanges 12$a$ and 14$a$ extend generally radially inwardly from the bight portion rather than radially outwardly, and the washer 10$a$ is particularly adapted to be preassembled with a screw member rather than a nut member. The free marginal edge of the flange 14$a$ is disposed substantially in a single plane for cooperation with a plurality of shoulders or protuberances 34 formed on the shank 36 of the screw member in order that the helically disposed free marginal edge of the flange 12$a$ has a diameter substantially greater than the internal diameter of the flange 14$a$ and the diameter of the screw shank to permit the passage of a tool 38 for forming the shoulders or protuberances 34 as shown in Fig. 6. As will be understood, helical threads may be rolled on the screw shank after the washer has been assembled thereon.

While the preferred embodiments of the present invention have been shown and described herein, it is obvious that many structural details may be changed without departing from the spirit and scope of the appended claims.

I claim:

1. A lock washer of resilient sheet metal stock comprising a split annulus which is U-shaped in radial cross section and presents a pair of radially extending axially spaced flanges integrally joined along adjacent margins by an annular body portion of arcuate cross section, the spacing of the free margins of said flanges gradually increasing from one extremity of the washer annulus adjacent the split portion thereof to the other extremity, the free margin of one of said flanges positioned substantially within a common plane and the free margin of the other flange defining a helix and presenting a work-engaging corner adjacent said split portion normally projecting axially beyond the opposite extremity of said flange adjacent said split portion.

2. A lock washer of resilient sheet metal stock as set forth in claim 1, wherein the flanges extend radially outwardly from the arcuate body portion.

3. A lock washer of resilient sheet metal stock as set forth in claim 1, wherein the flanges extend radially inwardly from the arcuate body portion.

4. A lock washer of resilient sheet metal stock as set forth in claim 1, wherein the flange margin positioned within a common plane defines a diameter which is less than the diameter defined by the free margin of the other flange.

5. In combination with the lock washer as defined in claim 1, a rotary threaded fastener member having a clamping surface adjacent the flange margin of the washer positioned within a common plane, and means on the rotary threaded fastener extending within the annular space between the washer flanges for securing said parts in preassembled relation.

References Cited in the file of this patent
UNITED STATES PATENTS 1,504,511     Ross _____ Aug. 12, 1924